Dec. 2, 1958     J. R. SHEA     2,862,262
SEALING STRIP FOR GLASS DOORS
Filed July 3, 1957     2 Sheets-Sheet 1
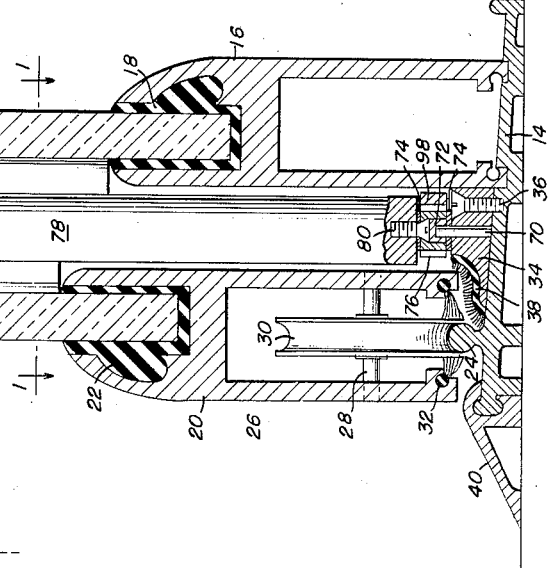
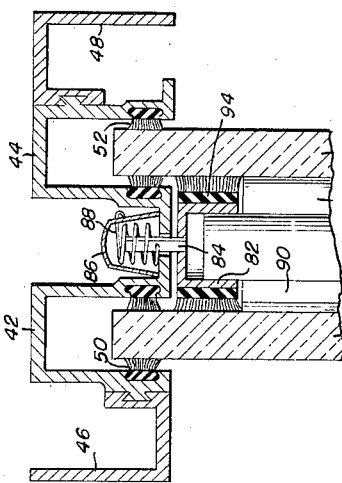
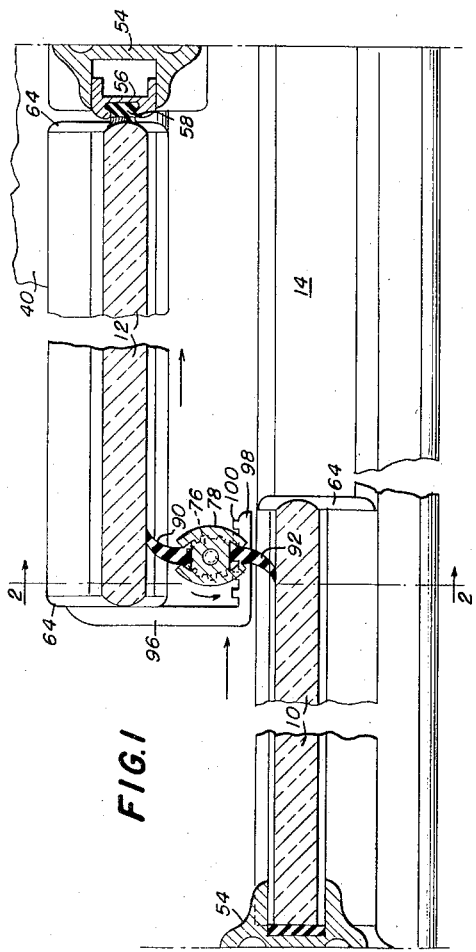
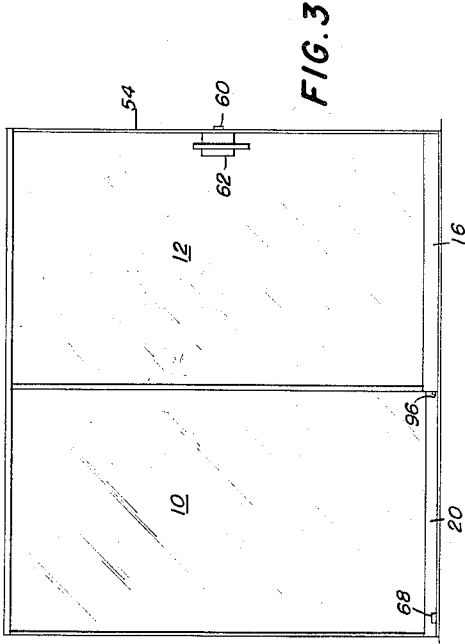
INVENTOR
JOHN R. SHEA
BY *Raphael Semmes*
ATTORNEY

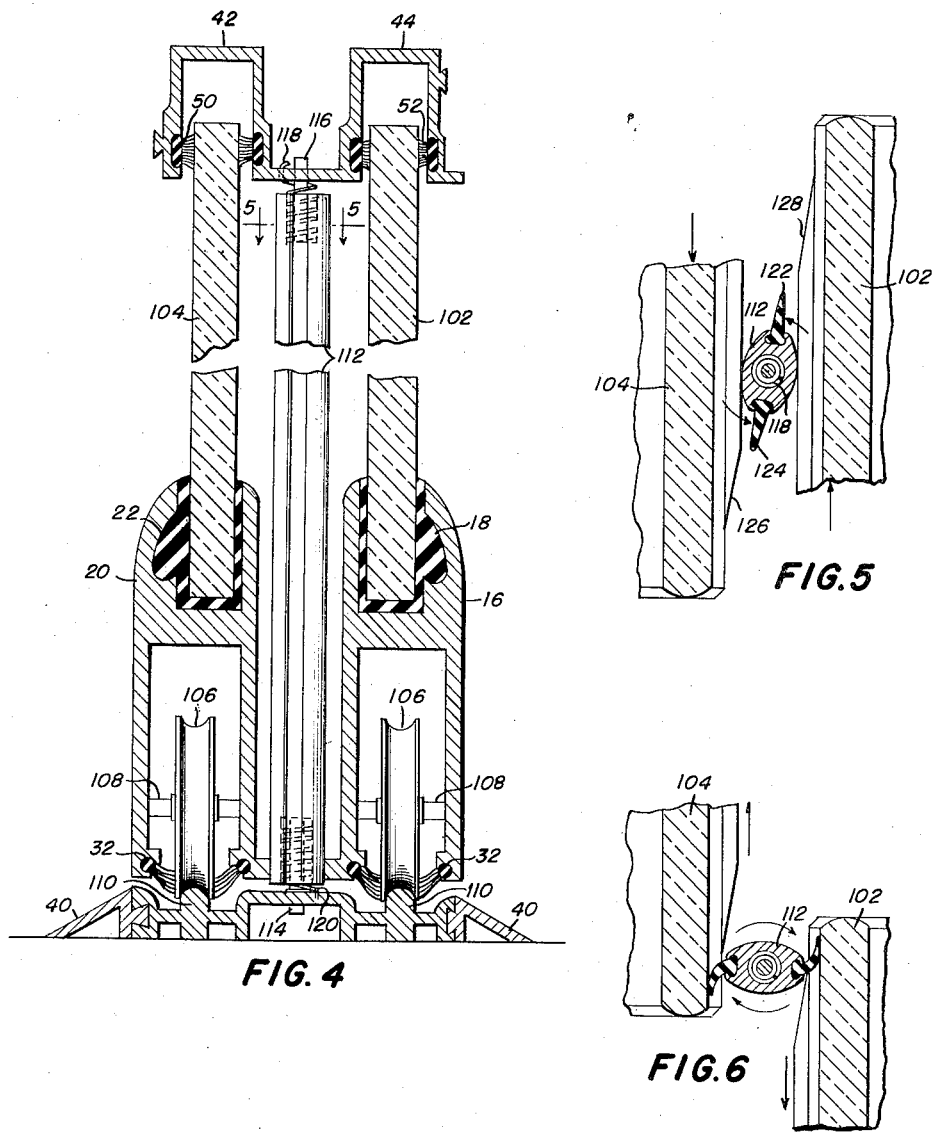

United States Patent Office 2,862,262
Patented Dec. 2, 1958

2,862,262

SEALING STRIP FOR GLASS DOORS

John R. Shea, Atlanta, Ga.

Application July 3, 1957, Serial No. 669,767

10 Claims. (Cl. 20—67)

The present invention relates broadly to sealing means for sliding closures and more specifically to a method and means of sealing or weatherstripping sliding doors and windows at the juncture of the fixed and sliding panels.

More specifically, the present invention relates to a sealing strip which is interposed between two panels in the nature of glass doors or windows, one of which can be fixed and one slidable or both slidable with respect to one another and which sealing strip is pivoted for rotary movement in response to the sliding of at least one of the members.

It is an object of the present invention to provide means disposed between two panel members or the like having such an arrangement that when the panels are in closed position, oppositely disposed sealing strips lie in sealing engagement with the respective panels, and upon the opening of at least one of the panels, its sliding movement rotates or permits rotation of the entire sealing device so as to immediately disengage the sealing strips from the panels, thus preventing smearing of wet doors, such for example as shower doors.

It is accordingly an important object of the present invention to provide a sealing device of the nature described which is automatically operable by movement of a door or the like to remove the sealing strip from engagement therewith.

Another object of the present invention is to provide a rotating weatherstripping which is opened and closed by the action of sliding a door or window panel and which can be held in its open position by spring or other action.

Another object of the present invention is to provide such a weatherstripping for sliding panels, windows or doors, which is held in closed position by a sliding panel which in turn can be secured by a latch placed in a practical position thereon.

A further object of the present invention is to provide a weatherstripping seal engageable either with the face of the panels or with the edges thereof to effect a seal therebetween.

An additional object of the present invention is to provide an automatically rotatable weatherstripping seal between panel members which can seal by engaging the face of the panels to permit greater tolerance in door or window opening size and/or panel size, and greater tolerance in plumbness of vertical edges than would be possible if the edges of the panel had to come into accurate alignment with each other for the successful functioning of an edge sealing device. The device of the present invention is equally applicable to edge sealing or face sealing between the sliding and fixed members.

Another object of this invention is to provide such a rotatable, automatically operable, weatherstripping seal which will not interfere with normal latching or locking either from the inside or outside and which can be applied readily to doors using this type of seal at the juncture of the panels.

A still further object of the present invention is to provide weatherstripping seals for sliding panels wherein the sliding panel can be placed either on the inside or outside by a simple change of design of actuating means for the seal.

An additional object of the present invention is to provide such a weatherstripping seal between panel members of the nature described wherein when using glass in the panels, the face of the glass on the sliding panel will not be wiped over by the weatherstripping as the panel opens and closes, since it engages the panels only on the final closing thereof, and disengages immediately when the panel starts to open. Thus unsightly streaks which would be particularly noticeable if the glass was wet are avoided.

Heretofore, glass doors or the like have utilized metal edging or frame supports with various types of seals therebetween. By means of the present invention, however, doors of all glass can be utilized without the necessity of such edgings to form sealing means.

Other objects and advantages of the present invention will be more readily apparent from the following detailed description of embodiments thereof, when taken together with the accompanying drawings in which:

Fig. 1 is a fragmentary horizontal sectional view through an embodiment of my present invention taken on line 1—1 of Fig. 2;

Fig. 2 is a fragmentary vertical sectional view taken on line 2—2 of Fig. 1;

Fig. 3 is an elevational view of a type of closure adapted for utilization of the present invention;

Fig. 4 is a fragmentary vertical sectional view similar to Fig. 2 but showing a further modification of the invention;

Fig. 5 is a fragmentary vertical sectional view taken on line 5—5 of Fig. 4; and Fig. 6 is a fragmentary vertical sectional view of the device of Fig. 5 showing the weatherstripping and panels in closed position.

In the various figures of the drawings, like reference characters are applied to similar parts and the following description is to be read and understood in this light.

For the purpose of illustrating an application of the present invention, the drawings disclose an embodiment including two glass door sections 10 and 12, of which the section 10 is fixed and the section or panel 12 is slidably related to the fixed section. A threshold 14 serves as a base for the members. A bottom rail 16 is provided for the fixed door section 10 in which the bottom is inserted and sealing or insulating material 18 seats the glass section in this bottom rail. A bottom rail 20 is provided for the slidable door portion 12 which also has its lower edge sealed by means of material shown at 22. An elongated circular rib 24, formed as a portion of threshold 14, constitutes a track for the sliding panel 12. Mounted in a recess 26 in bottom rail 20 by means of spindle 28 are adjustable ball bearing wheels 30, so shaped on their periphery as to roll on track 24 and by means of which the slidable panel 12 can be moved from opened to closed position and vice versa. Weatherstripping and anti-rattle inserts are provided at 32 which can be of any desired material, and coact with the rib 24 and wheel 30 in an obvious manner.

A bottom pivot shoe 34 is mounted on threshold 14 and secured by means of a screw at 36. Bottom shoe weatherstripping is inserted at 38 and is of any desired weatherstripping material. A threshold kick strip 40 is secured to threshold 14. Head members 42 and 44 are provided for the two panels and screen guide and interior head trim 46 and 48 are connected thereto as shown in Fig. 2. Weatherstripping and anti-rattle guides 50 and 52 coact with the heads 42 and 44. The usual jamb strips 54 are provided at the ends of the doors. On the slidable door jamb strip there is provided a jamb weatherstrip insert 56 having weatherstripping at 58 to provide the proper seal. A latch strike 60 is secured in proximity to the door latch at 62. Bottom rail end caps 64 are incorporated in the structure, and a screen track 66 is formed as a portion of threshold 14. A bumper 68 is provided to limit movement of slidable panel or door section 12 in the usual manner.

Inserted in the space between the panel sections 10 and 12 is the weatherstripping and sealing mechanism which is a very important feature of the invention. This consists in a pivot pin 70 supported in the bottom pivot shoe and carrying on the upper end thereof a pivot bearing 72 with the provision of thrust washers 74 to provide for proper disposition and action of the parts. A closure strip gear 76 is journalled on the pivot bearing 72 and secured to a rotatable closure strip 78 by means of a screw such as at 80. A top socket 82 is incorporated in the structure, and the rotatable closure strip has its top mounted by means of top pivot pin 84 in a coil spring housing 86, which incorporates a coil spring 88 having one end attached to the housing 86, and the opposite end coacting with and being attached to top pivot pin 84 for the purpose of biasing the rotatable closure strip to an open position.

The rotable closure strip has diametrically opposed closure strip weatherstripping fins 90 and 92 of sufficient length to fit between the bottom rails 16 and 20 and top socket weatherstripping shown at 94. These fins can be made of any desired material such as rubber, neoprene, plastic or other suitable material and the invention is not limited to the use of any specific material.

Secured to and carried by slidable panel 12 is closure hook 96 having an angularly disposed arm 98, with gear teeth 100 thereon formed in the nature of a gear rack for coacting with the teeth on closure strip gear 76 fastened to the rotatable closure strip 78.

In operation, when the door is in closed position as shown in Fig. 1 of the drawings, the rotatable closure strip and fins 90 and 92 carried thereon are rotated so that the fins are in contacting relationship with the panes of glass in the slidable and fixed panels 12 and 10 respectively, by coaction of the teeth 100 with the teeth on closure strip gear 76. The direction of rotation of the sealing strip member and fins thereon are indicated by arrows in Fig. 1. It will be apparent that this closing and sealing occurs only during the last portion of movement of the panel 12 into closed position and this prevents a wiping or smearing of the glass panels. When the door is to be opened, the teeth again coact to rotate the fins out of contact with the glass panels, assisted by the coil spring biasing the sealing device to open position.

While in the drawing a left-hand operating door has been disclosed wherein the weatherstripping rotates counterclockwise on closing, it is to be understood that by rearrangement of the parts, including, for example, the hook and spring arrangement, the doors can be arranged to slide in opposite direction with respect to one another. Such, however, is well within the skill of mechanics and need not be discussed in detail herein.

In the embodiment shown in Figs. 4–6 of the drawings, the same basic principles are retained. In this embodiment, however, both of the panels 102 and 104 are adapted for sliding movement, and each are supported by means of adjustable ball bearing wheels 106 rotatably journalled on spindles 108. Tracks 110 are provided as in the other embodiment. The rotatable closure strip 112 is again mounted by means of bottom pivot 114 and upper pivot 116, and again coil springs 118 and 120 coact with rotatable closure strip 112 to bias it to the desired position.

In this embodiment, however, the gears used in the previous embodiment for rotating the closure strip into contacting and sealing position are omitted. The same result is obtained, however, by the use of bevelled guide members or lips 126 and 128 formed near the inner ends of the two panel sections 102 and 104, and which can be carried by or affixed to the panel sections in any desired manner such as along the bottom rails. When the doors are in open position with respect to one another as shown in Fig. 5, the rotatable closure strip, by contacting with the full portions of the guide members 126, 128, will be maintained in open or non-contacting position. This is shown in Fig. 5 of the drawings.

As the doors are closed, however, the bevelled portions of the guides 126 and 128 permit rotation of the rotatable closure strip by means of the springs 118 and 120 so that the strip is moved into the sealing and closing position as indicated by the arrows shown in Fig. 6 of the drawings. When the doors are again opened with respect to one another, the bevelled portions 126, 128 of the guides will again coact with the rotatable closure strip to rotate it into the position of Fig. 5 wherein the fins 122 and 124 are out of contact with the glass panels. Other than this change, the two forms of the invention are similar in operation and results obtained.

Modifications considered to be within the confines and scope of the invention include the use of a plain hook striking a pivot bar for the rotatable closure strip off center, and springs can be used to force the pivot bar to the closed position while a lip, such as disclosed in Figs. 4–6, almost along the length of the bottom rail could oppose this force until the point of final closing. Still another method could utilize a system of linkage such as used on the wheel of a steam locomotive connecting it to a piston, and this could be used to rotate the pivot bar on final closing. Other methods can be used.

If desired, the weatherstripping can be thermostatically controlled at low heat to prevent icing, and various kinds of material can be used in the weatherstripping, including rubber, neoprene, mohair pile, stainless steel, a variety of plastics and others.

Manifestly, minor changes in details of construction can be effected without departing from the spirit and scope of the invention, as defined in and limited solely by the appended claims.

I claim:

1. A sealing mechanism for sliding closures of the type including at least one member slidable with respect to another member comprising a rotatable shaft mounted between said members in proximity to the inner ends thereof, diametrically opposed sealing strips secured to said shaft and adapted for sealing engagement with said members, said sealing strips also being of such a configuration and so mounted intermediate diametrically opposed faces of the said members as to engage only the said diametrically opposed faces when the said members are drawn to a closed position, and means connected to at least one of said members operatively engageable with said shaft for rotation thereof as said members approach closed position to rotate said sealing strips into sealing engagement with and between said members.

2. A sealing mechanism as claimed in claim 1, and including means connected with said shaft normally biasing said sealing strips out of engagement with said members.

3. A sealing mechanism as claimed in claim 2, said biasing means comprising a coil spring attached to said shaft.

4. A sealing mechanism as claimed in claim 1, said means for rotating said shaft including a closure hook secured to said slidable member and having gear teeth thereon, a closure gear attached to said shaft, engagement between the teeth on said hook and said gear acting to rotate said shaft and force said sealing strips into engagement with surfaces of both said members.

5. A sealing mechanism as claimed in claim 4, said closure hook being in proximity to the inner end of said slidable member and operable to rotate said shaft only when said members are substantially in closed position.

6. A sealing mechanism as claimed in claim 1, both of said members being slidable with respect to one another, lips mounted on opposing portions of said slidable members and having bevelled inner ends, a cam carried by said shaft, said lips engaging with and rotating said cam to disengage said sealing strips from engagement with said members when said members are in open position.

7. A sealing mechanism as claimed in claim 6, and including means connected to said shaft and biasing said sealing strips into engagement with said members when the bevelled portions are opposite one another to thereby disengage from said cam.

8. A sealing mechanism as claimed in claim 7, said biasing means comprising a coil spring connected to said shaft.

9. A sealing device for slidable closure members of the type wherein at least one member is slidable with respect to the other comprising a rotatable shaft means mounted intermediate diametrically opposed faces of the said closure members, and diametrically opposed sealing strips of flexible material secured to the said shaft means in such a fashion as to engage the said diametrically opposed faces of the closure members when the said members are drawn to a closed position, said sealing strips also being of such a width as to terminate short of the adjacent ends of said closure members when the closure members are drawn to a closed position.

10. A device as set forth in claim 9 including spring means for normally biasing said sealing strips out of engagement with the faces of said closure members.

References Cited in the file of this patent

UNITED STATES PATENTS

| | | |
|---|---|---|
| 770,444 | Rhodes | Sept. 20, 1904 |
| 1,695,903 | Sawyer | Dec. 18, 1928 |
| 1,741,998 | Marschke | Dec. 31, 1929 |
| 2,161,108 | Thomas | June 6, 1939 |
| 2,574,736 | Gerow | Nov. 13, 1951 |